April 8, 1924.
M. W. STERNS
ELECTRICAL COIL
Filed Feb. 10, 1919
1,490,040
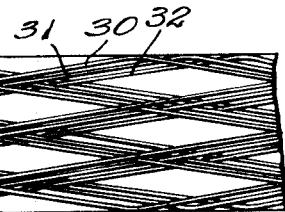
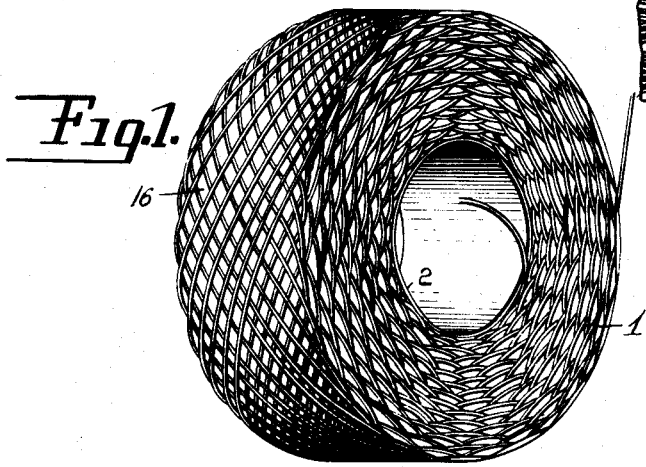
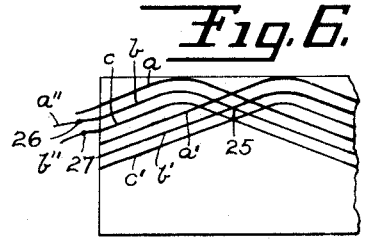
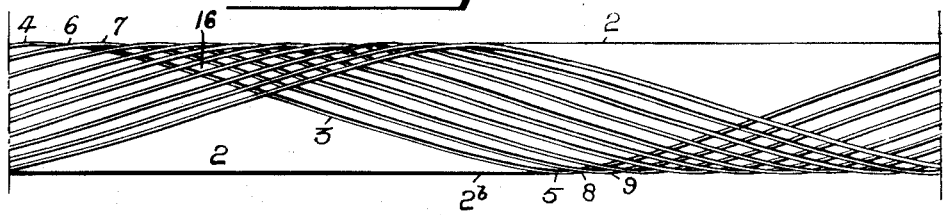
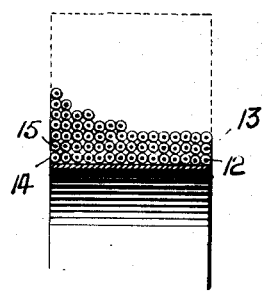
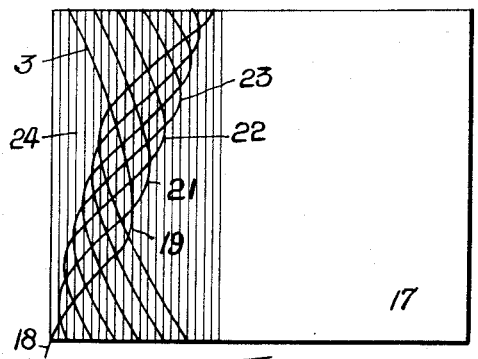
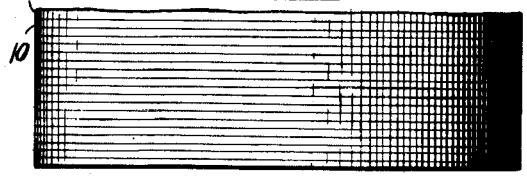
INVENTOR
Morton W. Sterns.
BY Herbert H. Thompson
his ATTORNEY Patented Apr. 8, 1924.

1,490,040

UNITED STATES PATENT OFFICE.

MORTON W. STERNS, OF NEW YORK, N. Y., ASSIGNOR, BY MESNE ASSIGNMENTS, TO COTO-COIL CO., OF PROVIDENCE, RHODE ISLAND, A CORPORATION OF MASSACHUSETTS.

ELECTRICAL COIL.

Application filed February 10, 1919. Serial No. 275,989.

*To all whom it may concern:*

Be it known that I, MORTON W. STERNS, a citizen of the United States of America, residing at 129 Wadsworth Avenue, New York city, in the county of New York and State of New York, have invented certain new and useful Improvements in Electrical Coils, of which the following is a specification.

This invention relates to electrical coils such as inductance coils, and to the method of winding the same. One object of the invention is to produce a coil of low distributed capacity and minimum high frequency resistance for use especially in radio, telegraph and telephony. A further object of the invention is to provide such a coil of compact form which is self-supporting and which may be economically produced by machine winding.

Referring to the drawings wherein I have shown several forms of my invention:

Figure 1 is a perspective view of one form of coil wound according to my invention;

Figure 2 is a development of a portion of the winding illustrating the course of the wire;

Figure 3 is a cross section of a coil wound in accordance with the usual winding method;

Figure 4 is a plan view of such a coil;

Figure 5 is a development showing a method of winding another another form of coil according to my invention;

Figure 6 is a development of a further modification; and

Figure 7 is a fragmentary development of a somewhat modified form of winding in accordance with my invention.

My improved coil may be wound by what is known as a "diagonal" or "V-wind" employed in the textile art for producing cops or packages of yarn and thread. With this system the wire or other strand of conductor is laid in spirals or helices extending from one end of the coil to the other and back again, with the turns crossing each other at a sharp angle at regular intervals. In winding textiles by this method the turns or helices of the yarn or thread are usually laid close together in parallel, contiguous relation to build complete layers superimposed in concentric relation from the core to the periphery of the package. In applying this principle to coil winding I have found that by spacing the turns or convolutions of conductor at a distance apart I am enabled to build up a self-supporting coil having a low distributed capacity and a minimum high frequency resistance.

Referring to the drawings my improved coil may be of any desired proportions, and as shown in Figure 1 it is of ring-shape, having a cylindrical periphery and flat sides or ends. Figure 1 illustrates the coil as wound from a single strand of suitably insulated wire, but for some purposes the conductor may be wound in multiple; that is, with two, three or more parallel strands. The coil 1 may be wound upon any suitable core of drum 2, such as bakelite, paper or the like. In winding, the wire 3 may be started at a point 4, Figure 2, and carried diagonally across the drum 2 to a point 5 at the opposite edge of said drum. It then turns back and is fed diagonally across the drum in the opposite direction, crossing over the first turn at 6. Reaching the edge $2^a$ at a point 7, a little in advance of the starting point 4, it turns and starts across the drum again, crossing the first turn once more at 8, reaching the edge $2^b$ at 9. This may go on until the desired number of turns are obtained. But this is an arbitrary matter, as the coil might be wound with a "quarter-wind," "third-wind," "one-wind," or any multiple thereof as best suited to the length of the coil required. In using a winding machine for winding the coil in this manner the end of the wire strand is made fast at one end of the core or mandrel and as the latter is rotated the wire is fed or guided in a path parallel to the axis of rotation. As the winding-mandrel makes a half revolution the wire guide completes its movement of traverse in one direction, the length of its traverse corresponding to the width of the coil to be produced, and the movement of the guide is then reversed to carry the wire back in the opposite direction. Each and every turn of the windings may be laid in place in this manner. Where a wide or long coil is being formed, the wire may, of course, be wound so that it makes a complete turn or several turns around the circumference of the coil during each traverse across the width of the coil in a given direction.

Preferably, the turns are spaced apart as before noted so as to form air spaces 16 therebetween. This as will be recognized will reduce the distributed capacity caused by the proximity and parallelism of the turns inversely as the square of the distance between the turns.

It will be seen that by winding the coil in this manner, I provide an openwork or cellular structure and I avoid the common practice of laying successive turns of wire against preceding turns and avoid also the inherent disadvantages of the latter type of coil.

In coils wound in accordance with the usual practice, with each succeeding turn 10 lying against the preceding turn 11 (Fig. 4), and where one layer 12 is first wound and the next 13 on top of it, the first and last turns 14, 15 of said layers will be adjacent and the total voltage of the two layers will be impressed between them, while the laterally adjacent turns will impress upon each other the voltage carried by each turn, and voltages varying between these two values will be impressed between the adjacent turns of adjacent layers. The high values of self-inductance thus effected combined with the high distributed capacity of such a coil cause it to resonate at a very high natural period.

While this spasmodic distribution of the potential gradient and the consequent high natural period of resonance may not be noticably disadvantageous in solenoid or other magnetic coils, it is of decided disadvantage in coils used in radio instruments.

In radio work a coil having a very low natural period is desirable so that it will resonate at a period so low as to be without the reach of the frequencies that traverse the circuit containing it. Such a coil will produce a uniform signal strength throughout its entire working range.

In a coil wound according to my invention, the potential gradient is distributed very evenly throughout.

I am aware of the banking method of winding coils, wherein several turns are made successively one over another, the wire dropping from the top turn of each tier to the bottom turn of the next. This method of winding is especially adapted to coils having a great many turns to each layer and very few layers. But where a large number of layers are employed, as for instance, fifty, it is obvious that a large potential difference will exist between adjacent turns of each layer, so that the banking method is not suitable for coils having a large number of layers. Nor does this type of winding lend itself to the practice of spacing the turns to obtain an increased thickness of dielectric. In my improved coil there is no place where turns having a high potential difference come in contact with each other, or lie against each other for considerable distances.

Obviously numerous variations in the manner of winding my coil may be employed, as for instance, when a wide coil is being made, instead of winding each turn all the way across the coil and back again as in the narrower type, the turns may be carried part way across the drum 17 (Fig. 5), as for instance, starting at 18, running across to a point 19 and then turning back. During this process, the drum 17 while rotating, may be moved bodily in the direction of its axis as indicated by the arrow 20. In this way the successive turns will advance across the drum as indicated at 21, 22, 23.

In order to increase the distance between the overlapping turns of wire in successive layers, I may apply any suitable insulating material such as threads 24 illustrated by way of example in Fig. 5 which may be wound upon the coil across the wire turns simultaneously with the winding of the wire.

In Fig. 6 I have shown another modification of my invention. In this form I may wind several strands of wire a, b, c, simultaneously or in multiple. The successive turns a', b', c' of these strands will cross over the preceding turns as at 25. When the desired number of turns are completed, the outer end a'' of strand a may be connected to the inner end of strand b as at 26, and the outer end b'' of strand b may be connected to the inner end of strand c as at 27. The effect is a re-entrant coil of zigzag turns, and the result is a still lower distributed capacity. When the wire is wound in multiple instead of singly, less time is required for producing a coil of a given number of turns.

While the turns of a given direction in successive layers of the coil may lie directly over the corresponding turns of the same direction in preceding layers, as indicated in Figure 1, they may be positioned slightly to one side or the other thereof. That is the overlying turns of a given direction may be offset one in relation to another from the center of the coil outwardly. For instance in Figure 7, 30 designates an outer turn and 31 an inner turn running in the same direction and which is shown as offset to one side of the turn 30, and 32 is still another inner turn of the same direction which is offset relative to turn 31. In my co-pending divisional application Serial No. 681,328, filed December 18, 1923, I disclose and claim a coil having this offset arrangement of the turns.

With the corresponding turns of wire in successive layers offset one from another, as last described, the coil is made porous due to the spacing apart of the turns in each layer, but the air cells are not continuous in a radial line from the center of the coil outwardly to its periphery. On the other hand, where the corresponding turns of wire in successive layers are placed directly over each other in the manner as first described with reference to Figure 1 of the drawings, the open air spaces 16 will extend substantially radially outward from the inner to the outer surface of the coil, thus producing a honeycombed structure.

The term "spaced" or "spaced apart" as applied herein to the turns of wire in each layer is to be understood as meaning that the wire in one turn is separated a substantial distance from the wire in adjacent turns and that the degree of separation is such that the resulting coil will have a relatively low distributed capacity and a relatively small high frequency resistance.

While I have shown and described several forms of coil involving the principles of my invention, other forms may of course be produced, and it is therefore to be understood that the invention is not limited to the particular structures or methods of procedure herein described.

Having described my invention, what I claim and desire to secure by Letters Patent is:

1. An electrical coil comprising wire wound diagonally back and forth with the turns of wire spaced apart.

2. An electrical coil comprising a plurality of turns of wire wound diagonally back and forth with each turn spaced apart from the preceding turn and with overlying turns crossing each other at an angle.

3. An electrical coil comprising a plurality of overlying layers of spaced turns of wire wound diagonally back and forth, the spacing of the turns being such as to form an openwork structure.

4. The method of winding an electrical coil which consists in winding a strand of wire diagonally back and forth in spaced turns with the turns separated sufficiently to form an openwork structure.

5. The method of winding an electrical coil which consists in winding wire back and forth on a rotating and axially advancing core.

6. The method of winding an electrical coil which consists in winding wire back and forth in spaced turns on a rotating and axially advancing core.

7. The method of winding an electrical coil which consists in winding wire back and forth in spaced turns on a rotating and axially advancing core, and simultaneously winding threads.

8. The method of winding an electrical coil which consists in winding wire back and forth in spaced turns and successive layers on a rotating and axially advancing core, and applying insulation between the layers.

9. An electrical coil comprising a plurality of spaced turns and spaced layers of wire, the turns being spaced sufficiently to form a cellular structure.

10. An electrical coil comprising a continuous wire wound diagonally back and forth in a plurality of successive turns with each new turn of the continuous wire spaced apart from the preceding turn.

11. An electrical coil comprising wire wound diagonally back and forth in helical turns crossing each other at a right angle and with the turns spaced apart and having insulating material wound across the wire turns.

12. An electrical coil comprising a wire wound in zig-zag course in overlapping turns, successive turns of which are displaced axially relative to preceding turns, the adjacent turns being spaced sufficiently to form an openwork structure.

13. An electrical coil comprising a wire wound in zig-zag course and successive layers, adjacent turns in each layer being spaced apart and successive layers being axially advanced relative to preceding layers.

14. An improved coil for electrical purposes comprising superimposed windings of conductor arranged with the convolutions helically disposed to cross each other at an angle and with the successive turns of the conductor spaced at a distance apart.

15. An improved electrical coil for radio use composed of successive windings of conductor disposed in helical convolutions extending diagonally back and forth across the coil to cross each other at regular intervals, said convolutions being spaced equidistantly apart to provide diamond-shaped air cells extending substantially radially of the coil and forming a honeycombed structure for the purpose specified.

16. An improved coil for electrical purposes comprising superimposed windings of conductor arranged with the turns of conductor disposed to cross each other at an angle and with the turns spaced at a distance apart to provide a cellular structure.

17. An electrical coil comprising a wire wound upon itself in succeeding layers, at a constant pitch with a space between adjacent wires of each layer, the wires of each layer pitched in a direction opposite to the wires of adjacent layers, and the wires of alternate layers pitched in like direction.

18. The method of constructing inductance coils to secure a minimum of distributed capacity which consists in winding a wire upon itself into a layer of turns of wire with the individual turns of substantially equal diameter and spaced apart from each other and inclined at a predetermined pitch with reference to the geometric axis of the coil, and then winding upon said layer a second layer of turns of wire with the individual turns thereof in like manner of substantially equal diameter and spaced apart from each other and inclined at the same pitch as the turns in the first layer but in the opposite direction, and continuing the winding of successive layers of turns having like characteristics of substantially equal diameter and spacing, and of opposite inclination with reference to the turns of the preceding layer, till a coil of the desired diameter is produced.

19. An improved coil for electrical purposes comprising successive windings of conductor disposed diagonally of the coil to cross each other at an angle and with the turns of the winding spaced apart to cross each other at an angle to form a honeycombed structure having radial air-passages extending continuously from the interior of the coil to its outer surface.

20. An improved electrical coil composed of layers of helical windings of conductor extending diagonally of the coil and crossing each other at an angle, the turns being spaced apart in the layers and those extending in the same direction in successive layers being disposed in overlying relation to form continuous air-passages extending radially from the axial center of the coil to its periphery.

21. An improved electrical coil comprising superimposed windings of conductor disposed in helical convolutions crossing each other at an angle and spaced apart to provide a honeycombed structure, the overlying turns of a given direction in the successive layers being placed directly over each other in a line extending radially from the axis of the coil.

In testimony whereof I have affixed my signature.

MORTON W. STERNS.